Figure 1:
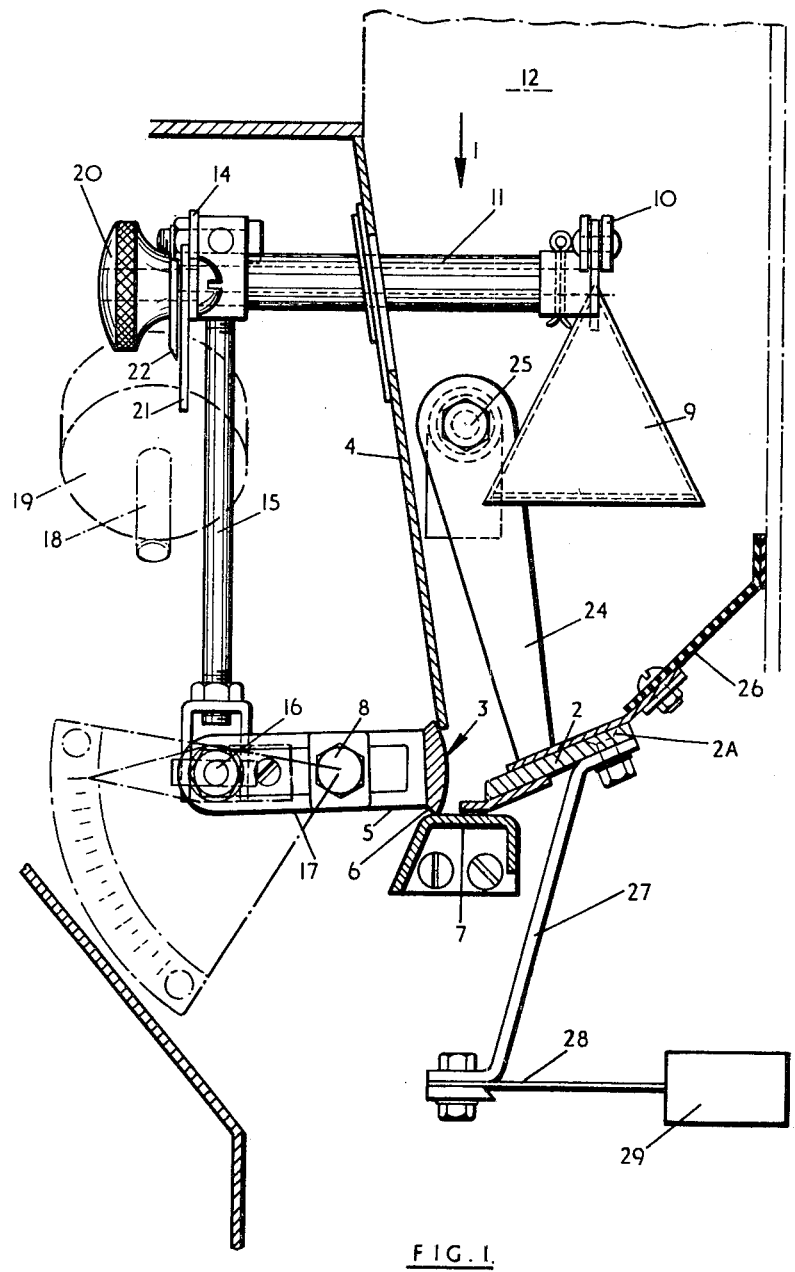

United States Patent Office 3,228,557
Patented Jan. 11, 1966

3,228,557
MEANS FOR CONTINUOUSLY FEEDING PULVERULENT OR GRANULAR MATERIALS
Keith L. Maddocks, Heaton Mersey, Stockport, England, assignor to Henry Simon Limited, Stockport, England, a British company
Filed Feb. 27, 1964, Ser. No. 347,780
Claims priority, application Great Britain, Mar. 1, 1963, 8,249/63
4 Claims. (Cl. 222—25)

This invention relates to feeding means for apparatus wherein a flowing stream of pulverulent or granular material is subjected to a continuous process, and is particularly directed to such feeding means wherein the stream of materials is formed into a moving relatively thin curtain of uniform density extending over the full width of the processing means.

Usually such a feeding means comprises a hopper member of a width not less than that of the required material curtain which hopper member is provided with an outlet port near or at its base extending over the full width of the required material curtain, and an adjustable feed-gate element arranged to operate as a closure means for the hopper outlet port but capable of being set to provide an outlet opening of such area as will allow of the outward flow of a material curtain of the required thickness. The said hopper element may incorporate positively driven material-impelling means arranged to agitate the material in the hopper so that it is maintained in a fluid condition and will pass readily to and through the outlet opening.

Where the flow-rate of material into such hopper member is constant, the feed-gate element can be adjusted to and fixed in a predetermined position, but where the flow-rate of material into the hopper can vary, it is desirable and usual to provide self-adjusting feed-gate control means whereby the feed-gate element is automatically moved to a position where the flow-rate of material from the hopper outlet is substantially equal to the flow-rate of material into the hopper.

Such feed-gate control means usually take the form of balanced linkages which are moved by members that respond to changes in the pressure head of the materials in the hopper or to changes in the drag forces generated by the material entering the hopper, but it is a disadvantage of known means employing the former of these alternatives that the apparatus tends to be insensitive and sluggish in operation; and it is a disadvantage of known means employing the latter alternative that in conditions where quantitively large flow-rate changes occur frequently, the apparatus tends to become unstable so that "hunting" occurs causing unreliable control.

The object of the present invention is to provide an improved feeding means having automatic feed-gate control mechanism which is free from these disadvantages.

According to the invention, feeding means for pulverulent or granular material wherein a positively driven material-impelling means is arranged in a feeder hopper to agitate the material therein, and wherein an outlet port which is vertically narrow relative to its horizontal width is provided at the bottom of one of the confining walls of the said hopper and wherein the effective area of the said outlet port is controlled by a counterbalanced pivoted feed-gate element which is arranged so that the port-closing part of the element remains parallel to the bottom of the outlet port as the said element is caused to rock on its pivots by linkages associated with sensing means for detecting changes in the rate of flow of incoming materials, is characterised in that the means which detects changes in the rate of flow of incoming materials and causes the pivoted feed-gate to be moved accordingly comprises, an upright prism-like member which may be shaped as a cone or a polygonal pyramid which is freely suspended at its apex from a relatively long substantially horizontal lever element mounted on a spindle at right-angles to the axis thereof and arranged so that the said prism-like member is within and clear of the walls of the hopper and in a position below the feed inlet and where material in the hopper reaches its maximum depth, the said spindle being freely journalled at a position above the outlet port in such a way that its axis is substantially horizontal and parallel to the direction of flow of material through the hopper outlet port, the said spindle having rigidly fixed at its end remote from the hopper a bell-crank lever one arm of which preferably is substantially parallel to and of substantially the same length as the prism-supporting lever, the said arm being arranged so that preferably at a position approximately in line with the point of suspension of the prism-like member, there is a freely pivoted substantially vertical link member which is pivotally attached at its lower end to a tie rod or similar member forming part of the counterbalance weight of the pivoted feed-gate, the other arm of the bell-crank lever being extended in a direction away from and downwardly inclined relative to the feed-gate operating arm, the said downwardly inclined arm supporting a weight to counterbalance the parallel arm and lever elements with their attachments and also the forces acting thereon, the downwards inclination of the counterbalance arm providing that the balancing effect of the counterweight supported thereon will vary in accordance with angular motion of the spindle resulting from vertical displacement of the prism-like member by material in the hopper.

Figure 2:
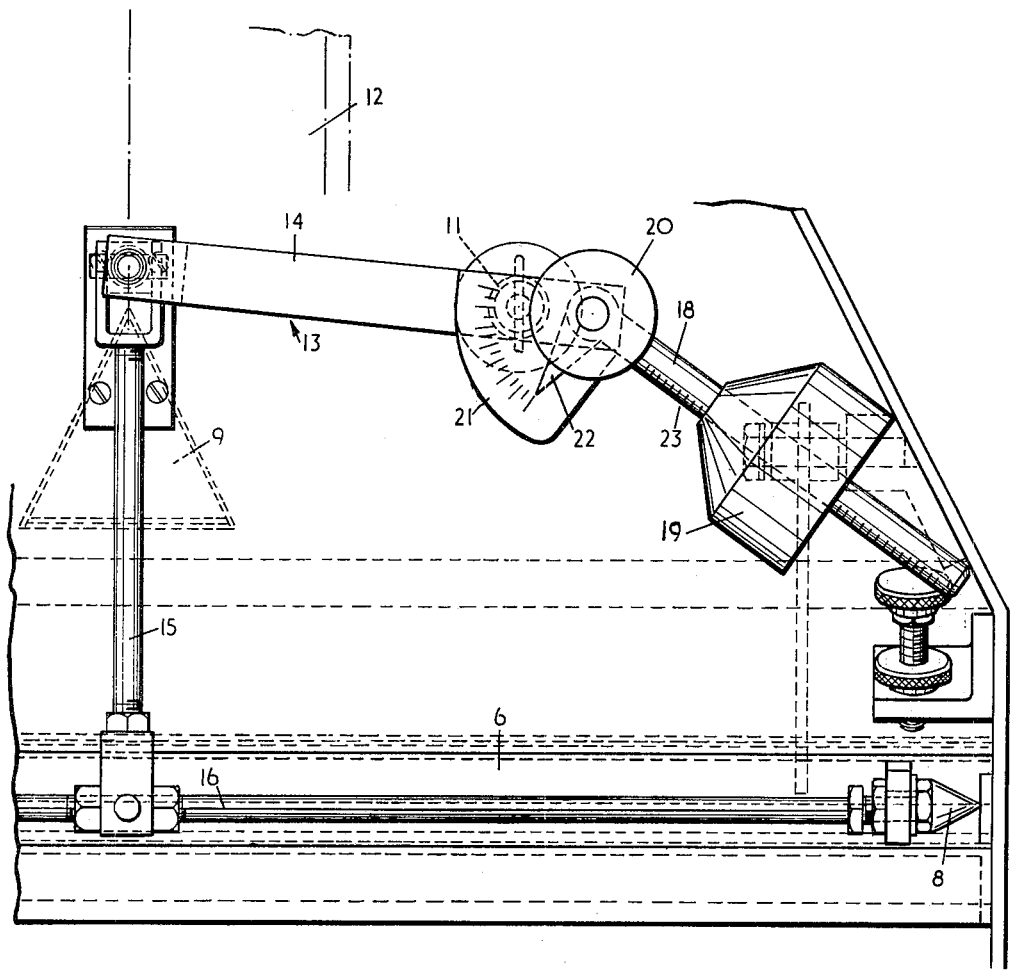

An embodiment of the invention will now be described, by way of example, with reference to the accompanying drawings, in which:

FIGURE 1 is a side view partly in section of a feeding means in accordance with the invention, and FIGURE 2 is a front view of the feeding means shown in FIGURE 1.

The feeding means shown comprises a feeder hopper 1 having a positively driven material-impelling means arranged to agitate the material, and comprising a stepped pusher-bar 2, extending over the full width of the hopper, and arranged to present a "staircase" aspect to the material being urged towards an outlet port 3. The pusher-bar 2 is carried by a pair of axially spaced arm extensions 24 which are pivotally supported from the hopper wall as indicated at 25. The inoperative edge 2A of the pusher-bar 2 provides an attachment zone for one side of a flexible membrane 26 which extends across the full width of the hopper 1 with its opposite side in fixed association with the wall thereof; the membrane 26 and upper surface of the pusher-bar 2 forming with the bottom 7 of the outlet 3 the base of the hopper 1. The material impelling means 2 is caused to pivot towards and away from the outlet 3 by a depending arm extension 27 which is connected by resilient means, for example, a horizontal leaf-spring 28 to a source of substantially horizontal rectilinear vibratory motion 29 the path of which is at right angles to the pusher-bar support pivot axis. The object of the "staircase" aspect referred to above can best be appreciated when it is understood that when the pusher-bar 2 pivots towards the outlet port 3 the leading edges of the "steps" push forward the material resting on the surface of the steps below, and when the pusher-bar moves back, the material resting on each step drops to the step below, to be pushed forward in turn at the next movement, the action thus inducing a cascade effect in the mass of material which effect tends to break down loose aggregates so that the layer "strickled-off" by the bottom edge of a feed-gate 5 is of substantially uniform density. The outlet port 3 which is vertically narrow relative to its horizontal width, is provided at the bottom of a confining wall 4 of the hopper 1, the effective area of outlet port 3 being controlled by the feed-gate 5 which is counterbalanced and pivoted and which is arranged so that the port-closing part 6 of the feed-gate 5 remains parallel to the bottom 7 of the outlet port 3 as the feed-gate is caused to move on its pivots 8. To detect changes in the rate of flow of incoming materials and cause the pivoted feed-gate 5 to be moved accordingly, there is provided an upright prism-like member 9, shaped as a cone which is freely suspended at its apex from a relatively long substantially horizontal lever element 10 mounted on a spindle 11 at right-angles to the axis thereof and arranged so that the cone 9 is within and clear of the walls of the hopper 1 and in a position below the feed inlet 12 and where material in the hopper 1 reaches its maximum depth. Spindle 11 is freely journalled in the walls of hopper 1 at a position above the outlet port 3 and with its axis substantially horizontal. Spindle 11 has rigidly fixed at its end remote from the hopper 1 a bell-crank lever 13, one arm 14 of which is substantially parallel to and of substantially the same length as the cone supporting lever 10, and is arranged so that, at a position approximately in line with the point of suspension of cone 9, there is a freely pivoted substantially vertical link member 15 which is pivotally attached at its lower end to a tie rod 16 forming part of the counterbalance weight 17 of the pivoted feed-gate 5. The other arm 18 of the bell-crank lever 13 is extended in a direction away from and downwardly inclined relative to the feed-gate operating arm 15, arm 18 supporting a weight 19 to counterbalance the arm 14 and lever elements with their attachments and also the forces acting thereon. The downwards inclination of the counterbalance arm 18 provides that the balancing effect of the counterweight 19 will vary in accordance with angular motion of the spindle 11 resulting from vertical displacement of cone 9 by material in the hopper 1. To enable the angle of inclination to be varied, the counterbalance arm 18 is hingeably adjustable in respect of its angle of inclination and is provided with a locknut 20 whereby arm 18 can be locked at any desired angle of inclination relative to the feed-gate operating arm 14. A graduated scale 21 and pointer 22 are provided to give a clear indication of the angular relationship of arm 18 to arm 14.

The counterbalance weight 19 is arranged to be slidably adjustable on arm 18, and a graduated scale 23 is provided on the arm 18 to indicate the positional relationship of weight 19 to arm 18.

The weight 19 and the inclination of the counterbalance arm 18 are so adjusted that when there is no incoming flow of material to the feeding means the cone 9 is raised to a position whereat the associated linkages cause the feed-gate 5 to close outlet port 3. When material starts to flow into the feeder the drag forces generated on the sloping surface of cone 9 by the material which flows over it, tend to move it downwardly so that feed-gate 5 will open, such tendency being resisted by the balancing effect of the counterweight 19, which effect provides an increased resistance to downwards movement of cone 9 as weight 19 is swung upwardly and outwardly along its arcuate path. According to the angular setting of the counterbalance arm 18 and the relative position of weight 19 on arm 18 the feed-gate control mechanism will limit the rate of outward flow of material from the hopper 1 to a condition which will permit a head of fluidised material to build up in the hopper to a predetermined level whereat cone 9 is at least partially immersed in the agitated material. In this condition cone 9 is caused to move upwards or downwards in the mass of fluidised material as influenced by the drag of the material flowing over its upper surface and by the pressure imposed on its sloped wall by the head of material above its lowest extremity, which pressure regulates the rate of vertical movement of cone 9 in such a way that its response to short term fluctuations in the input feed rate is so damped that the outlet feed-gate 5 is maintained in a steady condition at a position where the oulet port 3 of the hopper permits of a material flow therefrom which is in accordance with the average input flow-rate applying at the time.

What is claimed is:

1. Feeding means for pulverulent or granular material wherein a positively driven material-impelling means is arranged in a feeder hopper to agitate the material therein, and wherein an outlet port which is vertically narrow relative to its horizontal width is provided at the bottom of one of the confining walls of the said hopper and wherein the effective area of the said outlet port is controlled by a counterbalanced pivoted feed-gate element which is arranged so that the port-closing part of the element remains parallel to the bottom of the outlet port as the said element is caused to rock on its pivots by linkages associated with sensing means for detecting changes in the rate of flow of incoming materials, characterised in that the means which detects changes in the rate of flow of incoming materials and causes the pivoted feed-gate to be moved accordingly comprises, an upright prism-like member which may be shaped as a cone or a polygonal pyramid which is freely suspended at its apex from a relatively long substantially horizontal lever element mounted on a spindle at right-angles to the axis thereof and arranged so that the said prism-like member is within and clear of the walls of the hopper and in a position below the feed inlet and where material in the hopper reaches its maximum depth, the said spindle being freely journalled at a position above the outlet port in such a way that its axis is substantially horizontal and parallel to the direction of flow of material through the hopper outlet port, the said spindle having rigidly fixed at its end remote from the hopper a bell-crank lever one arm of which preferably is substantially parallel to and of substantially the same length as the prism-supporting lever, the said arm being arranged so that preferably at a position approximately in line with the point of suspension of the prism-like member, there is a freely pivoted substantially vertical link member which is pivotally attached at its lower end to a tie rod or similar member forming part of the counterbalance weight of the pivoted feed-gate, the other arm of the bell-crank lever being extended in a direction away from and downwardly inclined relative to the feed-gate operating arm, the said downwardly inclined arm supporting a weight to counterbalance the parallel arm and lever elements with their attachments and also the forces acting thereon, the downwards inclination of the counterbalance arm providing that the balancing effect of the counterweight supported thereon will vary in accordance with angular motion of the spindle resulting from vertical displacement of the prism-like member by material in the hopper.

2. Feeding means as claimed in claim 1 wherein the bell-crank lever is arranged so that its downwardly inclined counterbalance arm is hingeably adjustable in respect of its angle of inclination and is provided with clamping means whereby the arm can be locked at any desired angle of inclination relative to the feed-gate operating arm.

3. Feeding means as claimed in claim 2 wherein a graduated scale and pointer is provided for the relatively hinging elements of the bell-crank lever to give a clear indication of the angular relationship of the counterbalance arm to the feed-gate operating arm.

4. Feeding means as claimed in claim 1 wherein the counterpoise weight which is supported on the counterbalance arm is slidably adjustable thereon, and a graduated scale is provided on the said arm to indicate the positional relationship of the weight to the arm on which it is supported.

References Cited by the Examiner
UNITED STATES PATENTS

| | | | |
|---|---|---|---|
| 687,732 | 12/1901 | Dewey | 222—505 X |
| 764,705 | 7/1904 | Bousser | 222—505 X |
| 771,598 | 10/1904 | Baker | 222—505 X |
| 771,764 | 10/1904 | Bousser | 222—505 X |
| 1,775,369 | 9/1930 | Moog | 222—64 X |
| 1,810,773 | 6/1931 | Linders | 222—64 X |
| 2,513,215 | 6/1950 | Strehlow | 222—505 X |

M. HENSON WOOD, JR., *Primary Examiner.*
LOUIS J. DEMBO, *Examiner.*